United States Patent
Bandyopadhyay et al.

(10) Patent No.: US 12,248,614 B2
(45) Date of Patent: *Mar. 11, 2025

(54) COMPUTER-IMPLEMENTED METHODS, APPARATUSES, AND COMPUTER PROGRAM PRODUCTS FOR FREQUENCY BASED OPERATIONS

(71) Applicant: Wells Fargo Bank, N.A., San Francisco, CA (US)

(72) Inventors: Ananya Bandyopadhyay, Ranchi (IN); Shalini Jha, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,993

(22) Filed: Jan. 12, 2024

(65) Prior Publication Data

US 2024/0152650 A1 May 9, 2024

Related U.S. Application Data

(63) Continuation of application No. 17/242,718, filed on Apr. 28, 2021, now Pat. No. 11,907,402.

(51) Int. Cl.
*G06F 16/215* (2019.01)
*G06F 16/25* (2019.01)
(Continued)

(52) U.S. Cl.
CPC ........ *G06F 21/6254* (2013.01); *G06F 16/215* (2019.01); *G06F 16/25* (2019.01); *G06F 16/285* (2019.01)

(58) Field of Classification Search
CPC .. G06F 21/6254; G06F 16/285; G06F 16/215; G06F 16/25
(Continued)

(56) References Cited

U.S. PATENT DOCUMENTS 7,043,636 B2 5/2006 Smeets
7,370,140 B2 5/2008 Sartore
(Continued)

FOREIGN PATENT DOCUMENTS

CN 103870480 A 6/2014
CN 110399733 A 11/2019
(Continued)

OTHER PUBLICATIONS

Chao, Tan; "A Model-Based Approach to Generate Dynamic Synthetic Test Data," 2019 12th IEEE Conference on Software Testing, Validation and Verification (ICST), Retrieved from http://dx.doi.org/10.1109/ICST.2019.00063, Apr. 1, 2019 (1 page).
(Continued)

*Primary Examiner* — Thanh T Le
(74) *Attorney, Agent, or Firm* — K&L Gates LLP (57) ABSTRACT

Computer-implemented methods, apparatuses, and computer program products are provided for frequency based operations. An example computer-implemented method includes receiving a request for data transfer of a plurality of data elements of a production data environment to a non-production data environment. The method includes determining an access frequency associated with each data element and grouping each data element into a first set of data elements or a second set of data elements based upon the determined access frequency. The method further includes refreshing the first set of data elements according to a first refresh protocol defining a first refresh rate and refreshing the second set of data elements according to a second refresh protocol defining a second refresh rate less than the first refresh rate. The method also includes outputting the plurality of data elements to the non-production data environment.

20 Claims, 5 Drawing Sheets

(51) Int. Cl.
*G06F 16/28* (2019.01)
*G06F 21/62* (2013.01)

(58) Field of Classification Search
USPC .......................................................... 726/27
See application file for complete search history.

(56) References Cited

U.S. PATENT DOCUMENTS

| | | | |
|---|---|---|---|
| 8,363,519 B2 | 1/2013 | Lubbers | |
| 8,677,320 B2 | 3/2014 | Wilson | |
| 8,797,798 B2 | 8/2014 | Conley | |
| 8,930,381 B2* | 1/2015 | Raghunathan | G06F 21/6254 726/1 |
| 9,058,430 B2 | 6/2015 | Pal | |
| 9,123,422 B2 | 9/2015 | Yu | |
| 9,268,674 B1 | 2/2016 | Ben-Cnaan | |
| 9,317,219 B2 | 4/2016 | Kawakita | |
| 9,317,411 B2 | 4/2016 | Kalyanasundram | |
| 9,355,703 B2 | 5/2016 | Lee | |
| 9,356,966 B2 | 5/2016 | Patwardhan | |
| 9,432,298 B1 | 8/2016 | Smith | |
| 9,720,616 B2 | 8/2017 | Yu | |
| 9,741,016 B2 | 8/2017 | Chen | |
| 9,865,313 B2* | 1/2018 | Bahramshahry | G11C 7/1072 |
| 10,013,336 B2 | 7/2018 | Shah | |
| 10,289,533 B2 | 5/2019 | Kunz | |
| 10,324,827 B2 | 6/2019 | Narayanan | |
| 10,339,038 B1* | 7/2019 | Singh | G06F 11/3688 |
| 10,454,898 B2 | 10/2019 | Howard | |
| 10,467,130 B2 | 11/2019 | Raghavan | |
| 10,467,220 B2 | 11/2019 | Li | |
| 10,482,004 B2 | 11/2019 | Angermayer | |
| 10,741,143 B2 | 8/2020 | Dimitrov | |
| 10,754,574 B1* | 8/2020 | Jo | G06F 3/0613 |
| 10,790,005 B1 | 9/2020 | He | |
| 2006/0265338 A1* | 11/2006 | Rutkowski | H04L 63/045 705/71 |
| 2013/0139003 A1* | 5/2013 | Patwardhan | G06F 11/3684 714/E11.207 |
| 2014/0164405 A1 | 6/2014 | Tsai | |
| 2014/0181982 A1 | 6/2014 | Guo | |
| 2016/0147797 A1* | 5/2016 | Dolph | G06F 16/215 707/692 |
| 2018/0176597 A1 | 6/2018 | Edpalm | |
| 2019/0028531 A1* | 1/2019 | Nagar | G06F 21/128 |
| 2019/0228763 A1 | 7/2019 | Czarnowski | |
| 2019/0318205 A1 | 10/2019 | Loo | |
| 2019/0377820 A1 | 12/2019 | Kruempelmann | |
| 2020/0019489 A1 | 1/2020 | Shanmugam | |
| 2020/0058346 A1 | 2/2020 | Ito | |
| 2020/0089903 A1 | 3/2020 | Cachin | |
| 2020/0110696 A1 | 4/2020 | Liegard | |
| 2020/0311304 A1* | 10/2020 | Parthasarathy | G06F 11/3006 |
| 2020/0322127 A1 | 10/2020 | Lozac'H | |
| 2020/0334268 A1* | 10/2020 | Vasireddy | G06F 16/211 |
| 2022/0014351 A1* | 1/2022 | Jung | H04L 9/008 |

FOREIGN PATENT DOCUMENTS

| | | |
|---|---|---|
| WO | 2018224277 A1 | 12/2018 |
| WO | 2019193479 A1 | 10/2019 |
| WO | 2020099046 A1 | 5/2020 |

OTHER PUBLICATIONS

Hamad, Haj et al.; "Scalable Quality and Testing Lab (SQTL): Mission-Critical Applications Testing," 2019 International Conference on Computer and Information Sciences (ICCIS), Retrieved from http://dx.doi.org/10.1109/ICC1Sci.2019.8716404, May 19, 2021 (2 pages).

Jain, Ruby et al.; "An Approach Towards the Development of Scalable Data Masking for Preserving Privacy of Sensitive Business Data," Artificial Intelligence and Evolutionary Computations in Engineering Systems (AISC) vol. 1056, p. 733-743, Feb. 9, 2020 (6 pages).

Onu, Peter et al.; "Cloud Computing and IoT application: current statuses and prospect for industrial development," 9th International Conference on Operations and Supply Chain Management, Vietnam 2019, retrieved from https:/ lwww .journal.oscm-forum.org/journal/proceeding/download_paper/20191207220220_OSCM_2019_paper_168.pdf, May 19, 2021 (14 pages).

Kasturi, Santanam; "Some Aspects of Test Data Management Strategy," 2020 IEEE International Conference on Computing, Power, and Computing Technologies (GUCON), Oct. 2-4, 2020, p. 6-11 (7 pages).

Price, Huw; "Moving Beyond the Masking and Subsetting: Realizing the Value of Test Data Management," CA Technologies, Aug. 2015 (12 pages).

* cited by examiner

COMPUTER-IMPLEMENTED METHODS, APPARATUSES, AND COMPUTER PROGRAM PRODUCTS FOR FREQUENCY BASED OPERATIONS

CROSS REFERENCE TO RELATED APPLICATIONS

The present application is a continuation application of U.S. patent application Ser. No. 17/242,718, filed Apr. 28, 2021, which is hereby incorporated by reference in its entirety.

TECHNOLOGICAL FIELD

Example embodiments of the present disclosure relate generally to data analytics and, more particularly, to frequency based transfer of production data to non-production environments.

BACKGROUND

Financial institutions and other entities often collect or otherwise have access to a large amount of user data. This user data may be utilized by these entities, for example in non-production environments, to generate models, to complete testing activities, or to otherwise perform data analytics. The use of production level data in non-production environments, however, may require repeated transfer of this data between environments and performance of various data privacy related operations to secure the data.

BRIEF SUMMARY

In many industries, the use of high quality data is instrumental in performing data analytics that inform business decisions. The unavailability of realistic test data upon which to perform analytics and derive a near real-time solution for decision making, however, is a challenge faced by many organizations. Current attempts at, for example, testing an application rely upon copying data from production environments to non-production environments and using this production data for analytics. This use of production level data, however, presents numerous risks concerning data privacy and security. Conventional systems may also attempt to create test data that mimics production data in an anonymized form, but the synthetic data generated by these systems is based only upon a statistical understanding of the existing data and, as such, this synthetic data lacks business value. Said differently, a use of the synthetic data in non-production environments may fail to simulate real-time scenarios or to properly test regulatory requirements.

Traditional systems are further burdened by the amount of time and resources required to transfer production data into a non-production environment. For example, data from production environments that is transferred to a non-production environment may be subjected to various masking operations that remove, anonymize, or otherwise obscure underly user information associated with the production data and/or used to generate synthetic data based upon the production data. Performance of these, for example, masking operations for each data element is often computationally intensive resulting in increased processing time and resource consumption. Due to the volume of data elements transferred from the production environment, these conventional systems may also perform masking operations for data elements that ultimately are not used by a user in performing a data analytics or testing operation. As such, operation of these conventional systems may also result in various system inefficiencies that reduce the effectiveness of the data analytics performed in non-production environments.

To solve these issues and others, example implementations of embodiments of the present disclosure may utilize test data management systems and frequency servers that perform access frequency determinations associated with data elements to ensure efficient data transfer between production and non-production environments. In operation, embodiments of the present disclosure may determine an access count from operations that occur in the production data environment (e.g., as part of an initial load or otherwise) or from operations in the non-production data environment (e.g., one or more prior iterations or operations in the non-production environment). Such an access count may be compared against various frequency thresholds in order to group data elements into sets with associated refresh rates. For data elements that are accessed more frequently, a first refresh protocol may be used with a first refresh rate. For data elements that are infrequently accessed, a second refreshed protocol may be used with a second refresh rate that is less than the first refresh rate. The use of these distinct refresh rates for data elements based upon access frequency therefore eliminates or otherwise reduces unnecessary data element transfer operations (e.g., masking, generation of synthetic data, or the like) resulting in more efficient data transfer between production and non-production environments.

In this way, the inventors have identified that the advent of new test management systems have created a new opportunity for solutions for providing efficient data transfer which were historically unavailable. In doing so, such example implementations confront and solve at least two technical challenges: (1) they accurately identify complex data dependency relationships as related to access frequency determinations, and (2) they minimize storage and computational burdens associated with data analytic systems.

Systems, apparatuses, methods, and computer program products are disclosed herein for frequency based operations. With reference to an example computer-implemented method, a method for frequency based operations may include receiving a request for data transfer to a non-production data environment, wherein the request is associated with a plurality of data elements of a production data environment. The method may include determining an access frequency associated with each data element associated with the request for data transfer and grouping each data element into a first set of data elements or a second set of data elements based upon the determined access frequency. The method may further include refreshing the first set of data elements according to a first refresh protocol defining a first refresh rate and refreshing the second set of data elements according to a second refresh protocol. The second refresh protocol may define a second refresh rate less than the first refresh rate. The method may further include outputting the plurality of data elements to the non-production data environment.

In some embodiments, the non-production data environment may be associated with a business domain from amongst a plurality of business domains.

In some embodiments, determining the access frequency associated with each data element may include determining an access count for each data element and comparing the access count for each data element with a frequency threshold. In an instance in which the access count satisfies the frequency threshold, the method may include grouping the data element in the first set of data elements. In an instance in which the access count fails to satisfy the frequency threshold, the method may include grouping the data element in the second set of data elements.

In some further embodiments, the access count may be determined based upon operations in the production data environment.

In other embodiments, the access count may be determined based upon operations in the non-production data environment.

In some embodiments, grouping data elements may further include determining one or more data dependencies associated with a first data element. In such an embodiment, the method may include grouping the first data element into the first set of data elements based upon the determined access frequency and grouping a second data element into the first set of data elements based upon a data dependency between the first data element and the second data element.

In some embodiments, the first refresh protocol and the second refresh protocol employ one or more data masking or synthetic data generation operations associated with the first set of data elements and the second set of data elements, respectively.

In other embodiments, the first refresh protocol employs static data masking operations and the second refresh protocol employs dynamic data masking operations.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a frequency server as an example "apparatus." However, elements of the apparatus described herein may be equally applicable to the claimed method and computer program product. Thus, use of any such terms should not be taken to limit the spirit and scope of embodiments of the present disclosure.

DEFINITION OF TERMS

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "production environment" and "production data environment" are used interchangeably to refer to a setting, location, or the like within which applications, products, software, etc. are provided for use by end-users. The production data environment as described herein may include a collection of interconnected business domains (e.g., a first business domain, a second business domain, . . . , an $N^{th}$ business domain) Each business domain within the production data environment may include one or more repositories for storing user data, one or more interfaces for connecting with user devices, one or more computing devices configured to perform operations associated with the respective business domain, and/or the like. By way of example, the production data environment may be associated with a financial institution such that each of the business domains of the production data environment relate to functions of such a financial institution. By way of a particular example, a first business domain may be associated with mortgage related transactions of a financial institution, and a second business domain may be associated with credit card related transactions of the financial institution. Although described herein with reference to an example financial institution, the present disclosure contemplates that the embodiments of the present disclosure may be application to production data environments of any industry or type. The production data environment and associated business domains interconnected therein may be accessible by one or more software applications of the frequency server 200. Although described hereafter with reference to a collection of interconnected business domains, the present disclosure contemplates that the production data environment may also include one or more user devices as described herein with reference to a non-production data environment.

As used herein, the terms "non-production environment" and "non-production data environment" are used interchangeably to refer to a setting, location, or the like partitioned or otherwise separated from the production data environment within which applications, products, software, etc. are provided for testing or development (e.g., not available for use by end-users). The non-production data environment as described herein may include a collection of interconnected user devices (e.g., a first user device, a second user device, . . . , an $N^{th}$ user device) that may be used by associated users to perform testing or development as described above. Each user device within the non-production data environment may include one or more repositories for storing user data, one or more interfaces for connecting with other user devices, and/or one or more computing devices configured to perform testing operations. The non-production data environment and associated user devices interconnected therein may be accessible by one or more software applications of the frequency server 200. Although described hereafter with reference to a collection of interconnected user devices, the present disclosure contemplates that the non-production data environment may also include one or more business domains as defined above with reference to a production data environment.

As used herein, the terms "user device," "mobile device," "electronic device" and the like refer to computer hardware that is configured (either physically or by the execution of software) to access one or more services made available by a frequency server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the frequency server 200 or other computing devices via a network.

As used herein, the term "first user device" refers to a user device as defined above that is associated with a first user which may be in network communication with the frequency server, the second user device, and/or the non-production data environment. For example, a first user device may be a computing device of a first user that may request, receive, and/or provide data to or from one of the devices described above. Similarly, the term "second user device" refers to a user device as defined above that is associated with a second user which may be in network communication with the frequency server, the first user device, and/or the non-production data environment. For example, a second user device may be a computing device of a second user that may request, receive, and/or provide data to or from one of the devices described above.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1:
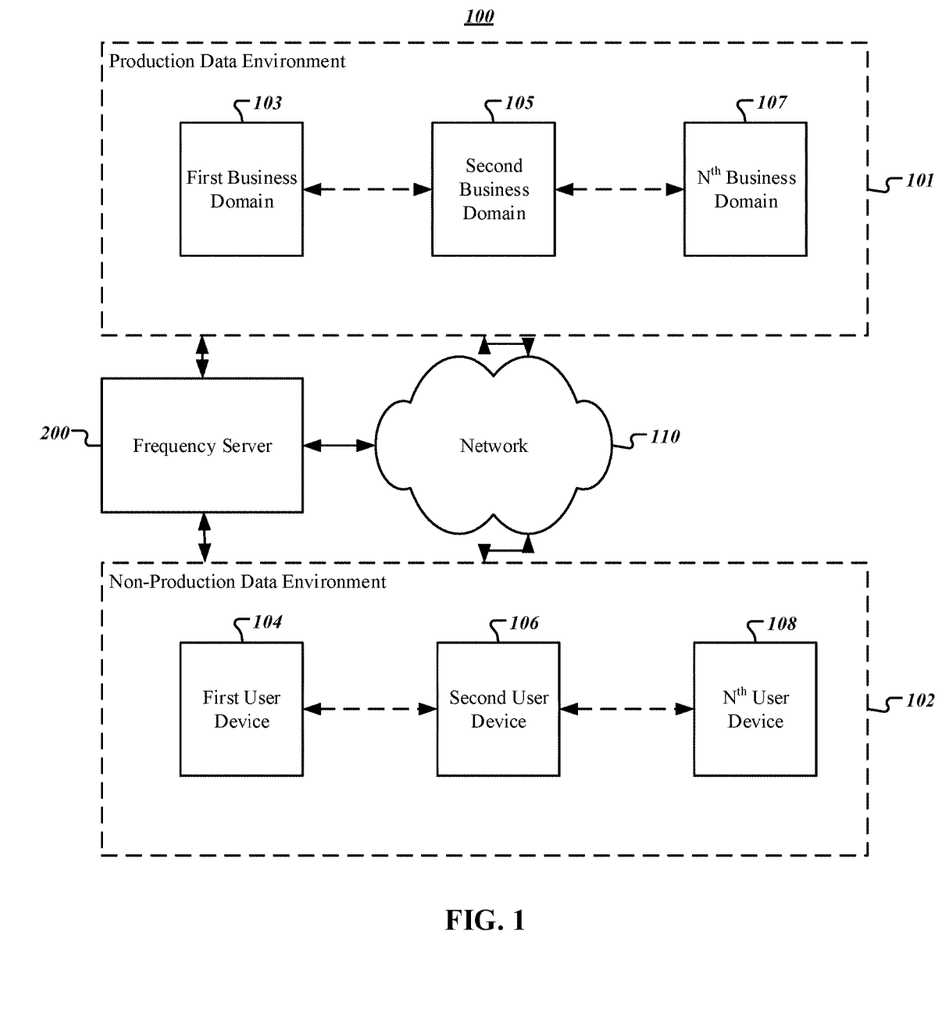
FIG. 1 illustrates a system diagram including devices that may be involved in some example embodiments described herein.

With reference to FIG. 1, an example system 100 is illustrated with an apparatus (e.g., a frequency server 200) communicably connected via a network 110 to a production data environment 101 and a non-production data environment 102. As shown, the production data environment 101 of the example system 100 may include one or more business domains (e.g., N number of business domains) as described above. In particular, the production data environment 101 is illustrated with a first business domain 103, a second business domain 105, and an $N^{th}$ business domain 107. The non-production data environment 102 of the example system 100 may include one or more user devices (e.g., N number of user devices) as described above. In particular, the non-production data environment 102 is illustrated with a first user device 104, a second user device 106, and an $N^{th}$ user device 108.

The frequency server 200 may include circuitry, networked processors, or the like configured to perform some or all of the apparatus-based (e.g., frequency server-based) processes described herein, and may be any suitable network server and/or other type of processing device. In this regard, frequency server 200 may be embodied by any of a variety of devices. For example, the frequency server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the frequency server 200 may be located remotely from the production data environment 101, the one or more business domains (e.g., the first business domain 103, the second business domain 105, and the $N^{th}$ business domain 107), and the non-production data environment 102, and/or the one or more user devices (e.g., the first user device 104, the second user device 106, and the $N^{th}$ user device 108). In other embodiments, the frequency server 200 may comprise one or more of the production data environment 101, the one or more business domains (e.g., the first business domain 103, the second business domain 105, and the $N^{th}$ business domain 107), and the non-production data environment 102, and/or the one or more user devices (e.g., the first user device 104, the second user device 106, and the $N^{th}$ user device 108). Said differently, the present disclosure contemplates that each of the devices illustrated in FIG. 1 may perform operations that occur remotely from or locally to the frequency server 200. The frequency server 200 may, in some embodiments, comprise several servers or computing devices performing interconnected and/or distributed functions. Despite the many arrangements contemplated herein, the frequency server 200 is shown and described herein as a single computing device to avoid unnecessarily overcomplicating the disclosure.

The network 110 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 110 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 110 may include a public network, such as the Internet, a private network, such as an intranet, or combinations thereof, and may utilize a variety of networking protocols now available or later developed including, but not limited to TCP/IP based networking protocols.

The production data environment 101 may include circuitry, networked processors, or the like configured to provide a setting, location, partition or the like within which applications, products, software, etc. are provided for use by end-users as defined above. The production data environment 101 as described herein may include a collection of interconnected business domains 103, 105, 107 that include one or more repositories for storing user data, one or more interfaces for connecting with user devices, one or more computing devices configured to perform operations associated with the respective business domain, and/or the like. By way of example, the first business domain 103 may be associated with mortgage related transactions of a financial institution and configured for use with mortgage related user data. By way of an additionally example, the second business domain 105 may be associated with credit card related transactions of the financial institution and configured for use with credit card related user data. Said differently, the production data environment 101 and business domains 103, 105, 107 therein may comprise custom repositories for each business domain so as to ensure that test data that is generated (e.g., in the non-production data environment) is business domain specific. For example, data stored by the first business domain 103 may include data quality metrics (e.g., controls, valid test cases, boundary values, etc.), data element semantics (e.g., length, datatype, etc.), and/or associated data masking or synthetic data generation algorithms, logic, or the like.

Given the interconnected nature of the business domains illustrated in the production data environment 101 of FIG. 1, the present disclosure further contemplates that these business domain specific repositories 103, 105, 107 may, in some embodiments, be community-governed and/or open source. By way of example, the production data environment 101 may operate as a centralized repository that may be updated by one or more authorized users (e.g., operators, administrators, or the like). Said differently, augmentations, modifications, or changes within the centralized production data environment 101 may operate to update any local, business specific domains 103, 105, 107. Although illustrated in FIG. 1 as distinct elements, the present disclosure contemplates that business domain specific user data described herein may be, in whole or in part, stored by the frequency server 200 or the non-production data environment 102. Said differently, the production data environment 101 and the non-production data environment 102 may include similar system components, structure, architecture, or the like based upon the intended application of the system 100.

The non-production data environment 102 may include circuitry, networked processors, or the like configured to provide a setting, location, or the like partitioned or otherwise separate from the production data environment within which applications, products, software, etc. are provided for testing or development (e.g., not available for use by end-users). The non-production data environment as described herein may include a collection of interconnected user devices (e.g., the first user device 104, the second user device 106, . . . , the $N^{th}$ user device 108) that may be used by associated users to perform testing or development as described above. The non-production data environment 102 and associated user devices may be accessible by one or more software applications of the frequency server 200. As described above, the non-production data environment 102 and the production data environment 101 may, in some embodiments, include similar system components, structure, architecture, or the like based upon the intended application of the system 100. Said differently, the present disclosure contemplates that the non-production data environment 102 and the production data environment 101 may each be supported by, have access to, and/or communicate with any of the elements illustrated in FIG. 1.

The first user device 104 may refer to a user device associated with a first user as defined above and may be a cellular telephone (e.g., a smartphone and/or other type of mobile telephone), laptop, tablet, electronic reader, e-book device, media device, wearable, smart glasses, smartwatch, or any combination of the above. Similarly, the second user device 106 may refer to a user device associated with a second user as defined above and may also be a cellular telephone (e.g., a smartphone and/or other type of mobile telephone), laptop, tablet, electronic reader, e-book device, media device, wearable, smart glasses, smartwatch, or any combination of the above. Although described hereafter with reference to a first user device 104 and a second user device 106, the example system 100 may include N number of user devices 107 associated with the same user or any number of respective other users. By way of example, the first user device 104 may be associated with a first user that requests data transfer to the non-production data environment 102 in order to perform a testing operation. Although illustrated in FIG. 1 as distinct elements, the present disclosure contemplates that user devices 104, 106, 108 and/or the non-production data environment 102 may be, in whole or in part, stored by the frequency server 200 or the production data environment 101.

Figure 2:
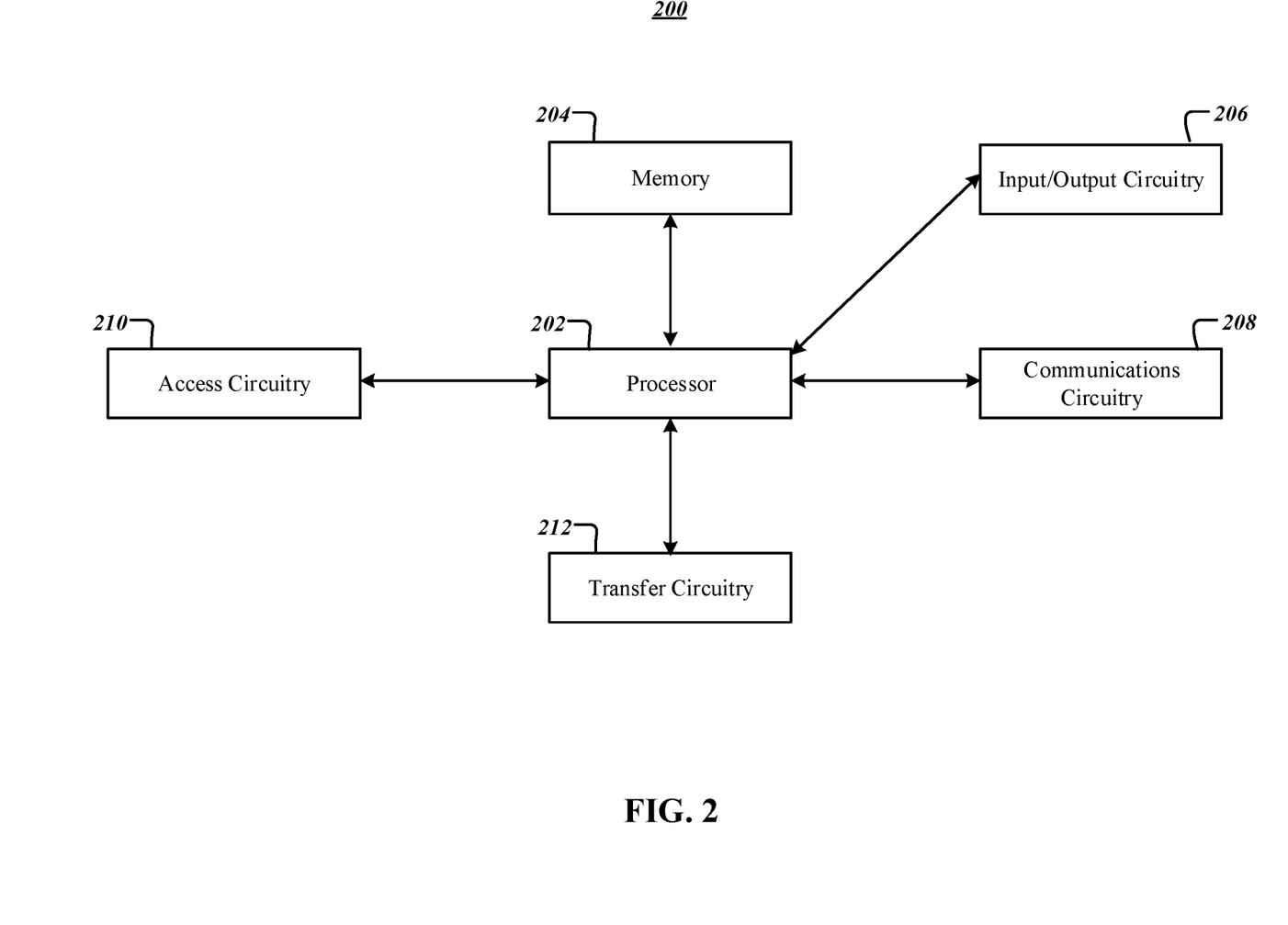
FIG. 2 illustrates a schematic block diagram of example circuitry that may perform various operations, in accordance with some example embodiments described herein.

As illustrated in FIG. 2, the frequency server 200 may include a processor 202, a memory 204, communications circuitry 208, and input/output circuitry 206. Moreover, the frequency server 200 may include access circuitry 210, and transfer circuitry 212. The frequency server 200 may be configured to execute the operations described below in connection with FIGS. 3-5. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the frequency server 200 may be housed within the devices of the production data environment 101 and/or the devices of the non-production data environment 102 (e.g., the first user device 104). It will be understood in this regard that some of the components described in connection with the frequency server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the frequency server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the frequency server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the frequency server 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the frequency server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The frequency server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the frequency server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the frequency server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The access circuitry 210 includes hardware components configured to determine to access frequency associated with data elements. Furthermore, the access circuitry 210 may group data elements based upon access frequency as described herein. The access circuitry 210 may utilize processing circuitry, such as the processor 202, to perform its corresponding operations, and may utilize memory 204 to store collected information. In some instances, the access circuitry 210 may determine access count for data elements and compare this access count with associated frequency thresholds.

The transfer circuitry 212 includes hardware components designed to refresh data elements as defined by associated refresh protocols. Furthermore, the transfer circuitry 212 may employ one or more data masking operations (e.g., static or dynamic) and/or one or more synthetic data generation operations. The transfer circuitry 212 may utilize processing circuitry, such as the processor 202, to perform its corresponding operations, and may utilize memory 204 to store collected information.

It should also be appreciated that, in some embodiments, the access circuitry 210 or the transfer circuitry 212, may include a separate processor, specially configured field programmable gate array (FPGA), or application specific interface circuit (ASIC) to perform its corresponding functions.

In addition, computer program instructions and/or other type of code may be loaded onto a computer, processor or other programmable frequency server's circuitry to produce a machine, such that the computer, processor other programmable circuitry that execute the code on the machine create the means for implementing the various functions, including those described in connection with the components of frequency server 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Frequency Based Operations

Figure 3:
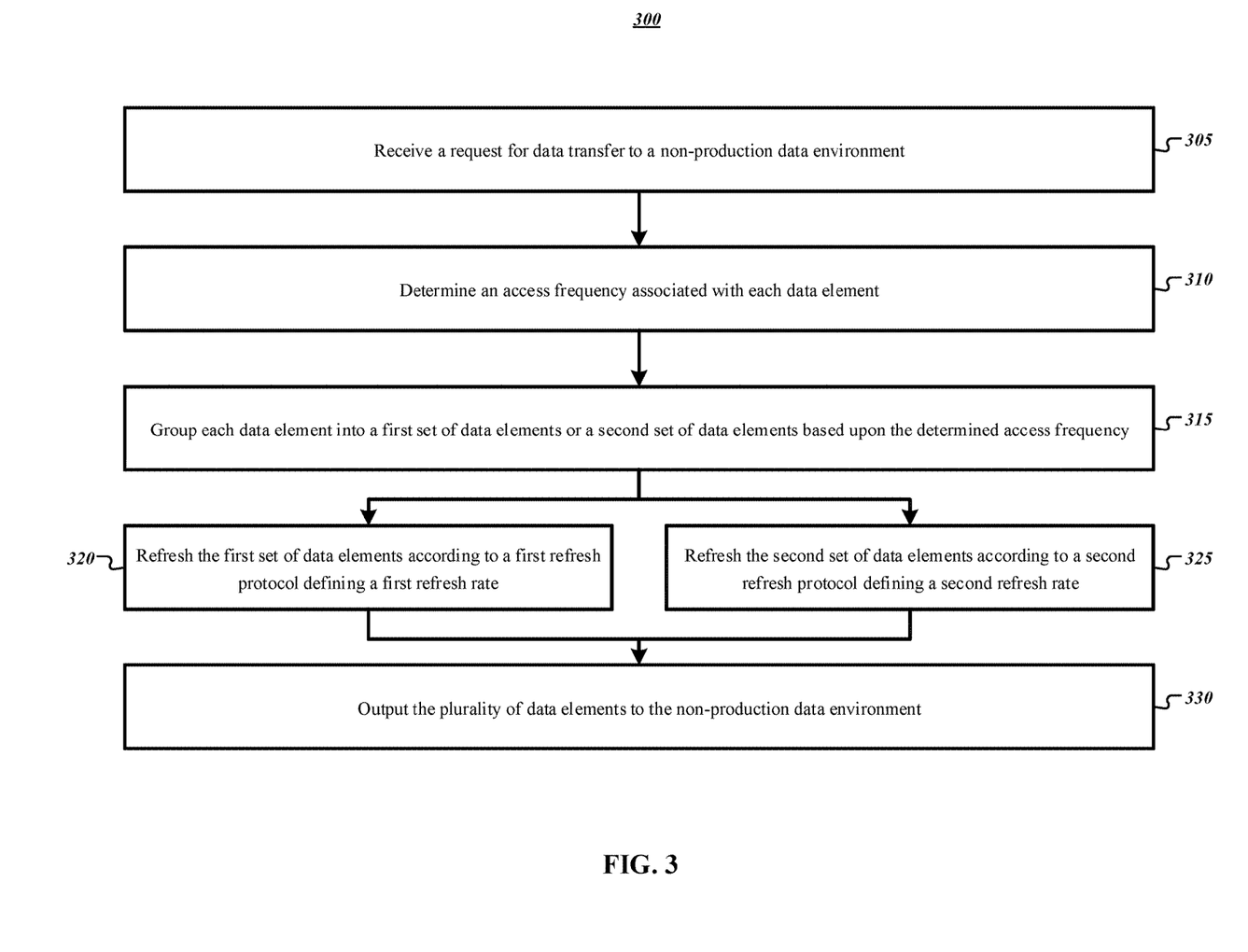
FIG. 3 illustrates an example flowchart for frequency based operations, in accordance with some example embodiments described herein.

FIG. 3 illustrates a flowchart containing a series of operations for frequency based operations. The operations illustrated in FIG. 3 may, for example, be performed by, with the assistance of, and/or under the control of an apparatus (e.g., frequency server 200), as described above. In this regard, performance of the operations may invoke one or more of processor 202, memory 204, input/output circuitry 206, communications circuitry 208, access circuitry 210, and/or transfer circuitry 212.

As shown in operation 305, the apparatus (e.g., frequency server 200) includes means, such as input/output circuitry 206, communications circuitry 208, or the like, for receiving a request for data transfer to a non-production data environment 102. The request may be associated with a plurality of data elements of the production data environment 101. As described above, the non-production data environment 102 may include one or more user devices 104, 106, 108 that may, in operation, perform testing operations. In order to provide business-specific testing operations, the user device, described hereafter with reference to first user device 104, may request a data transfer of business-specific data from the production data environment 101 to the non-production data environment 102. As such, in some embodiments, the frequency server 200 may receive the request for data transfer at operation 305 from the first user device 104. By way of a particular example, a first user associated with the first user device 104 in the non-production data environment 102 may intend to perform a testing operation that requires user data associated with mortgage transactions. As such, the first user may attempt to perform such a testing operation, and a request for data transfer from, for example, the first business domain 103 of mortgage related user data. Although described herein with reference to user data from a single business domain, the present disclosure contemplates that the request for data transfer may refer to user data from one or more business domains based upon the testing operation associated with the request.

In other example embodiments, the request for data transfer at operation 305 may instead refer to an initial loading procedure of data from the production data environment to the frequency server 200 and/or the non-production data environment 102. By way of example and as described hereafter, the non-production data environment 102 may initially lack user data from the production data environment 101 and/or may be refreshed (e.g., replacement or modification of non-production level data). In such an embodiment, the request for data transfer at operation 305 may refer to an initial request to populate user data in the non-production data environment 102. In some instances, the data within the non-production data environment 102 may lack data found in the production data environment 101, may include expired data entries, or the like such that a data refresh operation is necessary to update the data within the non-production data environment 102. As such, the request at operation 305 may refer to such an update request by the non-production data environment 102 or user devices therein. The present application contemplates that a refresh operation of all or substantially all of the data within the non-production data environment 102 may occur periodically (e.g., as defined by a refresh schedule or protocol) or responsive to one or more changes in the testing operations performed in the non-production data environment 102.

Thereafter, as shown in operation 310, the apparatus (e.g., frequency server 200) includes means, such as input/output circuitry 206, access circuitry 210, or the like, for determining an access frequency associated with each data element associated with the request for data transfer. As described above, various data elements that are within the non-production data environment 102 may be infrequently used in performing a testing operation. As such, the frequency at which these data elements are accessed may be less than the frequency at which other data elements within the non-production data environment 102 are accessed. As described hereafter with reference to FIG. 4, the access circuitry 210 may be configured to determine an access count associated with each data element associated with the request for data transfer received at operation 305. By way of example, in instances in which the request for data transfer refers to an initial request to populate or refresh data within the non-production data environment 102, the access frequency associated with each data element may refer to access count data associated with the production data environment 101.

By way of continued example, an initial load or population of the non-production data environment 102 of user data may indicate a lack or absence of access count data within the non-production data environment 102 (e.g., an absence of testing operation performance). In other words, without performance of a testing operation within the non-production data environment 102, the access circuitry 210 may lack access count data within the non-production data environment 102 upon which to perform an access frequency determination. As such, the access circuitry 210 may alternatively rely upon the access count data associated with the production data environment 101 for such access count data. For example, the access circuitry 210 may determine the number of times a particular data element is used, requested, or otherwise accessed within the production data environment 101 and assign a numerical value (e.g., a count) indicative of this access.

In instances in which the request for data transfer refers to a request for data transfer at operation 305 from, for example, the first user device 104, the access frequency determined at operation 310 may refer to an indication of access by the first user device 104 within the non-production data environment 102. By way of continued example, the first user associated with the first user device 104 in the non-production data environment 102 may intend to perform a testing operation that requires user data associated with mortgage transactions. As such, the first user may attempt to perform such a testing operation via the first user device 104, and a request for data transfer from the production data environment 101 (e.g. the first business domain 103 or otherwise) of mortgage related user data. In order to determine the frequency at which the first user and/or first user device 104 accesses particular data elements, the access circuitry 210 may receive access count data from one or more operations performed by the first user device 104 within the non-production data environment 102. Although described herein with reference to a single example user and user device (e.g., the first user device 104), the present disclosure contemplates that any number of users and associated user devices may simultaneously access functionality of the frequency server 200, the production data environment 101, and/or the non-production data environment 102.

By way of a particular example, the first user device 104 may iteratively, periodically, etc. perform testing operations within the non-production data environment 102 that include one or more searches, interface interactions (e.g., user clicks or the like), etc. associated with particular data elements. Furthermore, previously-performed testing operations by the first user and first user device 104 similarly access particular data elements within the non-production data environment 102 in order to complete these testing operations. As such, the access circuitry 210 at operation 310 may determine the number of times a particular data element is used, requested, or otherwise accessed within the non-production data environment 102 and assign a numerical value (e.g., a count) indicative of this access. Additionally, the present disclosure contemplates that an access determination as described herein may include any interaction by a user or user device with the production data environment 101 and/or the non-production data environment 102 based upon the intended application of the system 100.

Thereafter, as shown in operation 315, the apparatus (e.g., frequency server 200) includes means, such as processor 202, access circuitry 210, or the like, for grouping each data element into a first set of data elements or a second set of data elements based upon the determined access frequency. As described hereafter with reference to FIG. 4, the access circuitry 210 may determine an access count associated with each data element indicative of the number of times (e.g., in the non-production data environment 102 and/or the production data environment 101) each data element is used, requested, or otherwise accessed. The access circuitry 210 may employ one or more frequency thresholds in order to determine how a particular data element is to be grouped. By way of example, a system administrator (e.g., as part of an initial set up procedure or otherwise) may define a frequency threshold that defines a minimum account count within a determine time period (e.g., an frequency threshold of greater that ten (10) within the last day). Although described herein with reference to a first set and a second set of data elements, the present disclosure contemplates that the data elements may be grouped into any number of sets based upon the intended application of the system 100.

In such an example, the access circuitry 210 may compare the access count for a particular data element over the determined time period to determine if the access count associated with the particular data element satisfies the frequency threshold. For example, an access count of fifteen (15) during the prior day would exceed this example frequency threshold and, therefore, satisfy this frequency threshold. By way of an additional example, the frequency threshold may instead refer to a percentage of the total number of data elements (e.g., the top 25% of data elements based upon largest access count). Although described above with reference to a frequency threshold defined by a system administrator, the present disclosure contemplates that the frequency server 200 may, in some embodiments, employ artificial intelligence and/or machine learning to dynamically modify the frequency threshold.

With continued reference to operation 315, the access circuitry 210 may group each data element into either a first set of data elements or a second set of data elements based upon the access frequency (e.g., access count data) determine at operation 310. For example, the frequency threshold described above may be used to determine the data elements that are frequently used by a particular user, particular user device (e.g., first user device 104), particular testing operation, and/or particular business domain. The data elements having, for example, an access count that satisfies the frequency threshold may be frequently-accessed and, therefore grouped into a first set of data elements. The data elements having, for example, an access count that fails to satisfy the frequency threshold may be infrequently-accessed and, therefore grouped into a second set of data elements.

Thereafter, as shown in operation 320, the apparatus (e.g., frequency server 200) includes means, such as the processor 202, the transfer circuitry 212, or the like, for refreshing the first set of data elements according to a first refresh protocol defining a first refresh rate. As described above, the first set of data elements may be associated with the data elements that are frequently-used (e.g., based upon access count) within the non-production data environment 102. In order to ensure the accuracy of the testing operations performed within the non-production data environment 102 that rely upon these frequently-used data elements (e.g., data elements of the first set), the transfer circuitry 212 may operate to frequently refresh or otherwise update these data elements. By way of example, the transfer circuitry 212 may define a first refresh protocol to be used with data elements of the first set. This first refresh protocol may define a first refresh rate associated with each of the data elements within the first set. The first refresh rate may refer to the frequency at which the particular data element in the non-production data environment 102 is to be updated to account for any changes to the underlying user data element in the production data environment 101.

By way of continued example, the first user device 104 may perform a testing operation in the non-production data environment 102 that relies upon user mortgage data (e.g. of the first business domain 103 or otherwise). One or more data elements (e.g., mortgage data) within the non-production data environment 102 may be frequently-accessed (e.g., of the first set) by the first user device 104 in the testing operation such that the integrity of the testing operation is influenced by the accuracy of the one or more data elements. As such, the first refresh rate of the first refresh protocol may operate to update the one or more data elements to account for any updates to the underlying data elements in the production data environment 101. By way of a particular example, the first refresh protocol may, in some embodiments, define a first refresh rate that refreshes (e.g. updates, replaces, etc.) each of the data elements of the first set with each performance of the testing operation. Said differently, the first refresh rate of the first refresh protocol may operate to refresh any and all data elements that satisfy the frequency threshold described hereafter with reference to FIG. 4 (e.g., the data elements of the first set). Furthermore, the present disclosure contemplates that the refresh rate may be set or approved by an associated user of the system 100 or based upon one or more patterns associated with the user of the system 100.

The first refresh protocol may further employ one or more data masking or synthetic data operations associated with the first set of data elements. As described above, the non-production data environment 102 may refer to the setting or location in which testing operations are performed. In order to protect the privacy associated with the user data within the production data environment 101, the frequency server 200 may mask (e.g., anonymize, redact, or otherwise protect) the data elements for use in the non-production data environment 102. In some embodiments, the frequency server 200 may generate synthetic data that is associated with or otherwise indicative of the data elements of the production data environment 101 but anonymizes the data elements for use in the non-production data environment 102. In light of the computational burden associated with performance of these masking and/or synthetic data generation operations, the data elements of the second set described hereafter with reference to operation 325 (e.g., infrequently-access data elements) may be refreshed less frequently (e.g., at a second refresh rate less than the first refresh rate). By way of a continued example, in some embodiments, the first user and first user device 104 may intend to perform a testing operation that uses data elements of the first set. In response, the transfer circuitry 212 may, according to the first refresh protocol and first refresh rate, retrieve data elements from the production data environment 101 associated with the data elements of the first set, perform any data masking or synthetic data generation operations, and supply the data element to the first user device 104 in the non-production data environment 102.

Thereafter, as shown in operation 325, the apparatus (e.g., frequency server 200) includes means, such as the processor 202, the transfer circuitry 212, or the like, for refreshing the second set of data elements according to a second refresh protocol, wherein the second refresh protocol defines a second refresh rate less than the first refresh rate. As described above, the second set of data elements may be associated with the data elements that are infrequently-used (e.g., based upon access count) within the non-production data environment 102. In order to reduce the computation burden of the frequency server 200, the transfer circuitry 212 may operate to infrequently refresh or otherwise update these data elements. By way of example, the transfer circuitry 212 may define a second refresh protocol to be used with data elements of the second set. This second refresh protocol may define a second refresh rate associated with each of the data elements within the second set that is less than the first refresh rate. As above, the second refresh rate may refer to the frequency at which the particular data element in the non-production data environment 102 is to be updated to account for any changes to the underlying user data element in the production data environment 101.

By way of continued example, the first user device 104 may perform a testing operation in the non-production data environment 102 that relies upon user mortgage data (e.g. of the first business domain 103 or otherwise). One or more data elements (e.g., mortgage data) within the non-production data environment 102 may be infrequently-accessed (e.g., of the second set) by the first user device 104 in the testing operation such that the integrity of the testing operation is unimpacted by the accuracy of the one or more data elements. As such, the second refresh rate of the second refresh protocol may operate to update the one or more data elements periodically to account for any updates to the underlying data elements in the production data environment 101. By way of a particular example, the second refresh protocol may, in some embodiments, define a second refresh rate that refreshes (e.g. updates, replaces, etc.) each of the data elements of the second set with every third performance of the testing operation. Although described herein with reference to a refresh rate of every third performance of the testing operation, the present disclosure contemplates that the second refresh rate may be varied based upon the intended application of the system 100.

The second refresh protocol may also further employ one or more data masking or synthetic data generation operations associated with the second set of data elements. In light of the computational burden associated with performance of these masking and/or synthetic data generation operations, the data elements of the second set (e.g., infrequently-access data elements) may be refreshed less frequently (e.g., at a second refresh rate less than the first refresh rate). By way of a continued example, in some embodiments, the first user and first user device 104 may intend to perform a testing operation that uses data elements of the second set. In response, the transfer circuitry 212 may, according to the second refresh protocol and second refresh rate, only periodically retrieve data elements from the production data environment 101 associated with the data elements of the second set, perform any data masking or synthetic data generation operations, and supply the data element to the first user device 104 in the non-production data environment 102.

In some embodiments, the frequency server 200 may employ a hybrid model in which the first refresh protocol employs static data masking operations and the second refresh protocol employs dynamic data masking operations. A static data masking operation may refer to the transfer of an entire set (e.g., the first set) of data elements into the non-production data environment 102. Due to the increased access frequency associated with the first set of data elements, the transfer circuitry 212 may statically mask the data elements of the first set by performing associated data masking operations and storing the masked first set of data elements in the non-production data environment 102. A dynamic masking operation may refer to the storage of unmasked data elements (e.g., underlying data elements of the second set) in the production data environment 101 and the real-time performance of masking operations to provide the masked second set of data elements in the non-production data environment 102. In such an embodiment, the combination of static and dynamic data masking may create a hybrid masking operations that optimizes the use of computational resources.

Thereafter, as shown in operation 330, the apparatus (e.g., frequency server 200) includes means, such as the processor 202, or the like, for outputting the plurality of data elements to the non-production data environment. As described above, the first set of data elements may be more frequently-refreshed according to the first refresh rate and the second set of data elements may be less frequently-refreshed according to the second refresh rate. Following performance of the operations 320 and 325, the combined plurality of data elements requested at operation 305 may be output into the non-production data environment 102 for use in performing an associated testing operation. In any embodiment, the combined plurality of data elements, refresh protocol(s), and/or the like may be provided to an associated user of the system 100 for approval prior to output to the non-production data environment 102.

Figure 4:
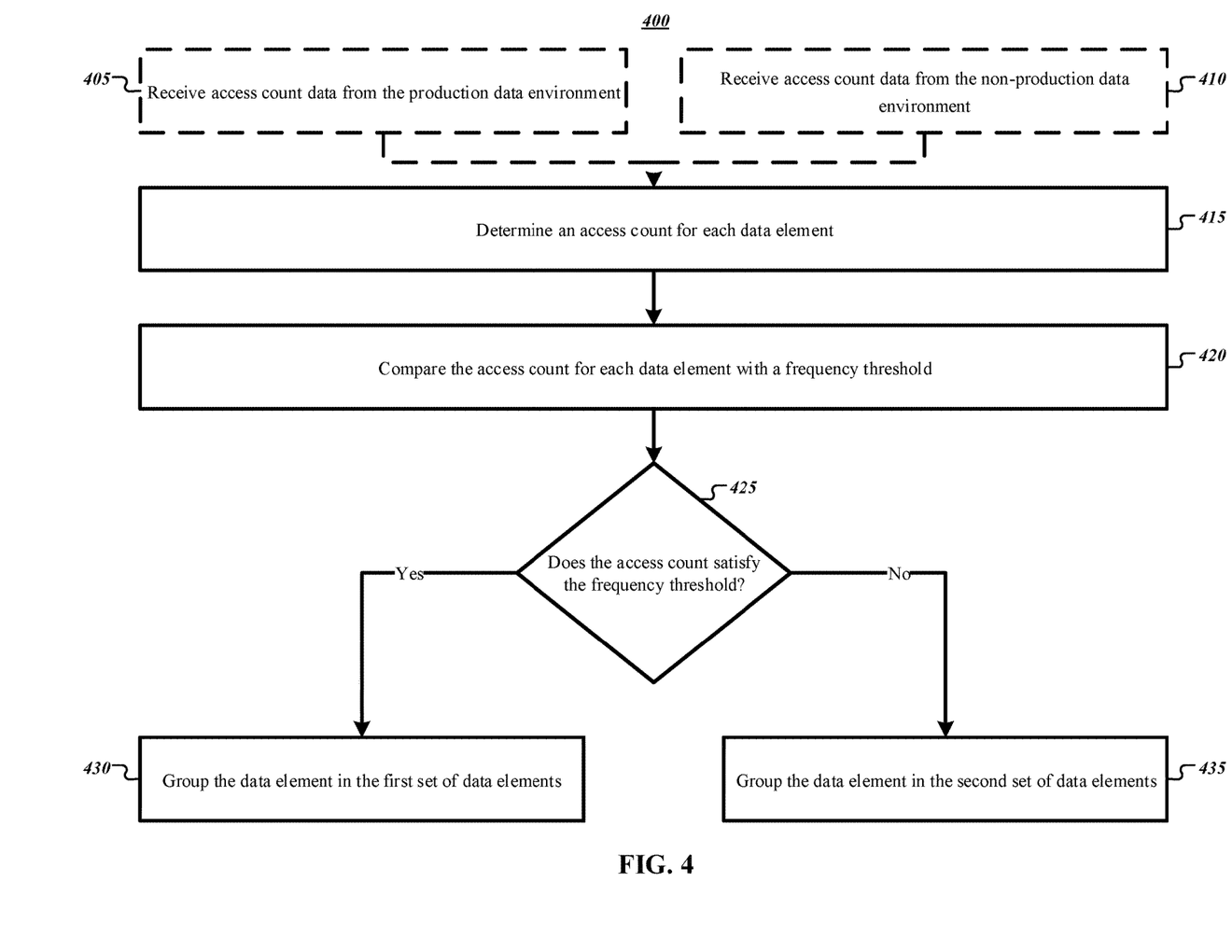
FIG. 4 illustrates an example flowchart for access count determinations, in accordance with some example embodiments described herein.

Turning next to FIG. 4, a flowchart is shown for access count determinations. The operations illustrated in FIG. 4 may, for example, be performed by, with the assistance of, and/or under the control of an apparatus (e.g., frequency server 200), as described above. In this regard, performance of the operations may invoke one or more of processor 202, memory 204, input/output circuitry 206, communications circuitry 208, access circuitry 210, and/or transfer circuitry 212.

As shown in operation 405, in some embodiments the apparatus (e.g., frequency server 200) includes means, such as input/output circuitry 206, communications circuitry 208, access circuitry 210, or the like, for receiving access count data from the production data environment. As described above with reference to operation 305, in some embodiments, the request for data transfer may refer to an initial loading procedure of data from the production data environment to the frequency server 200 and/or the non-production data environment 102. By way of example, the non-production data environment 102 may initially lack user data from the production data environment 101 and/or may be refreshed (e.g., replacement or modification of non-production level data). In such an embodiment, the request for data transfer may refer to an initial request to populate user data in the non-production data environment 102. In such an example, the access circuitry 210 may lack access count data within the non-production data environment 102 upon which to perform an access frequency determination. As such, the access circuitry 210 may alternatively rely upon the access count data associated with the production data environment 101 for such access count data. For example, the access circuitry 210 may determine the number of times a particular data element is used, requested, or otherwise accessed within the production data environment 101 and assign a numerical value (e.g., a count) indicative of this access.

As shown in operation 410, the apparatus (e.g., frequency server 200) includes means, such as input/output circuitry 206, communications circuitry 208, access circuitry 210, or the like, for receiving access count data from the non-production data environment. As described above with reference to operation 305, in some embodiments, the frequency server 200 may receive the request for data transfer from the first user device 104. By way of a particular example, a first user associated with the first user device 104 in the non-production data environment 102 may intend to perform a testing operation that requires user data associated with mortgage transactions. By way of a particular example, the first user device 104 may iteratively, periodically, etc. perform testing operations within the non-production data environment 102 that include one or more searches, interface interactions (e.g., user clicks or the like), etc. associated with particular data elements. Previously-performed testing operations by the first user and the first user device 104 may similarly access particular data elements within the non-production data environment 102 in order to complete these testing operations. As such, the access circuitry 210 at operation 410 may determine the number of times a particular data element is used, requested, or otherwise accessed within the non-production data environment 102 as the access count data from the non-production data environment 102 and assign a numerical value (e.g., a count) indicative of this access count.

As shown in operation 415, the apparatus (e.g., frequency server 200) includes means, such as input/output circuitry 206, access circuitry 210, or the like, for determining an access count for each data element. As described above with reference to operations 410 and 415, the access circuitry 210 may determine an access count that is a numerical representation of the attempts to access a particular data element based upon access count data from the production data environment 101 or the non-production data environment 102. This access count may, in some embodiments, be associated (e.g., stored as metadata or otherwise) with a respective data element for use the with the frequency thresholds described hereafter.

As shown in operations 420 and 425, the apparatus (e.g., frequency server 200) includes means, such as input/output circuitry 206, access circuitry 210, or the like, for comparing the access count for each data element with a frequency threshold. As described above, the access circuitry 210 may employ one or more frequency thresholds in order to determine how a particular data element is to be grouped. By way of example, the access circuitry 210 may define a frequency threshold that defines a minimum account count within a determine time period (e.g., an frequency threshold of greater that ten (10) within the prior day). In such an example, the access circuitry 210 may compare the access count for a particular data element over the determined time period to determine if the access count associated with the particular data element satisfies the frequency threshold. For example, an access count of fifteen (15) during the last day would exceed this example frequency threshold and, therefore, satisfy this frequency threshold.

By way of an additional example, the frequency threshold may instead refer to a percentage of the total number data elements (e.g., the top 25% of data elements based upon largest access count). In such an example embodiment, the access circuitry 210 may order each of the data elements based upon access count (e.g., in ascending or descending order) and may, determine that the 25% of data elements having the largest access count are to be grouped in the first set as described hereafter. Although described herein with reference to a percentage of count threshold, the present disclosure contemplates that the access circuitry 210 may employ a frequency threshold of any type, amount, or the like based upon the intended application of the server 200. Furthermore, the present disclosure contemplates that the frequency server 200 may, in some embodiments, employ artificial intelligence and/or machine learning to dynamically modify the frequency threshold during operation of the access count determinations described herein. By way of a particular example, the access circuitry may determine that the computational load experienced by the frequency server 200 is increased and, in response, increase the frequency threshold so as to reduce the number of data elements in the first set. Alternatively, the access circuitry may determine that the computational load experienced by the frequency server 200 is decreased and, in response, decrease the frequency threshold so as to increase the number of data elements in the first set. In doing so, the access circuitry 210 may operate to maximize the effectiveness of the operation described herein while minimizing the computation load experienced by the system 100.

In an instance in which the access count satisfies the frequency threshold, as shown in operation 430, the apparatus (e.g., frequency server 200) includes means, such as input/output circuitry 206, access circuitry 210, or the like, for grouping the data element in the first set of data elements as described above with reference to operation 315. In an instance in which the access count fails to satisfy the frequency threshold, the apparatus (e.g., frequency server 200) includes means, such as input/output circuitry 206, access circuitry 210, or the like, for grouping the data element in the second set of data elements as also described above. In this way, the embodiments of the present disclosure operate to eliminate or otherwise reduce unnecessary data element transfer operations (e.g., masking, generation of synthetic data, or the like) resulting in more efficient data transfer between production and non-production environments.

Figure 5:
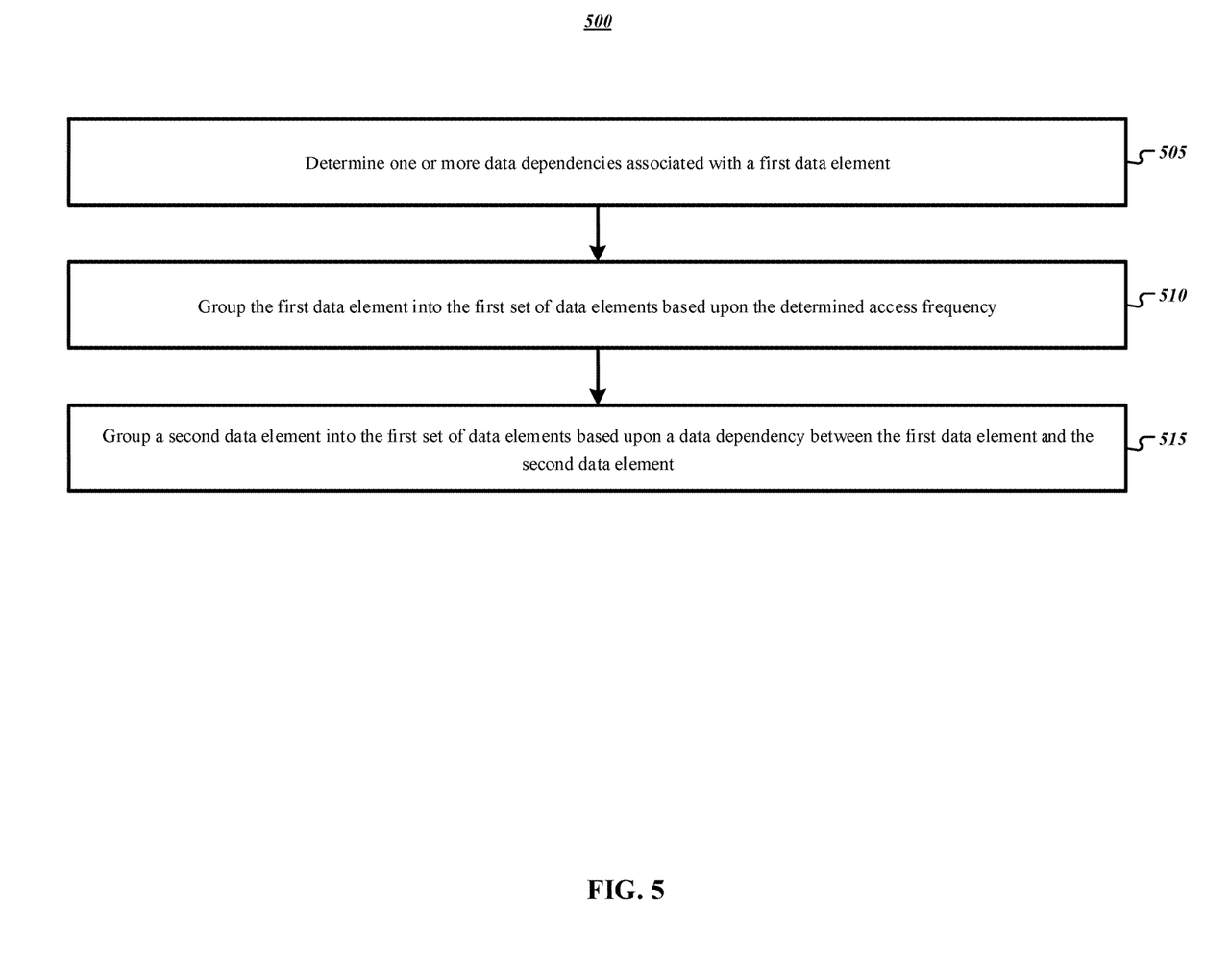
FIG. 5 illustrates an example flowchart for data dependency determinations, in accordance with some example embodiments described herein.

Turning next to FIG. 5, a flowchart is shown for data dependency determinations. The operations illustrated in FIG. 5 may, for example, be performed by, with the assistance of, and/or under the control of an apparatus (e.g., frequency server 200), as described above. In this regard, performance of the operations may invoke one or more of processor 202, memory 204, input/output circuitry 206, communications circuitry 208, access circuitry 210, and/or transfer circuitry 212.

As shown in operation 505, the apparatus (e.g., frequency server 200) includes means, such as input/output circuitry 206, access circuitry 210, or the like, determining one or more data dependencies associated with a first data element. In some embodiments, the data elements that are frequently-accessed in performing testing operations within the non-production data environment 102 may rely upon other data elements. By way of example, a testing operation to be performed by the first user device 104 related to mortgage transactions may require data elements associated with user credit scores. As such, data elements of the production data environment 101 associated with user credit scores may be frequently-accessed by the frequency server 200 in order for the first user device 104 to complete its intended testing operation. Said differently, data elements in the non-production data environment 102 based upon user credit score data of the production data environment 101 may be grouped in the first set of data elements and, as such, may be refreshed according to the (more frequent) first refresh rate. However, the data elements associated with user credit score may be associated with, related to, or otherwise dependent upon user credit card balance data. As such, refreshing of the data elements associated with user credit score alone may fail to account for underlying changes in user credit card balance data. As such, the access circuitry 210 at operation 505 functions to identify any data dependencies between an example first data element.

In such an example embodiment, as shown in operation 510, the apparatus (e.g., frequency server 200) includes means, such as the processor 202, the access circuitry 210, or the like, for grouping the first data element into the first set of data elements based upon the determined access frequency. As described above with reference to operation 320, the first set of data elements may be associated with the data elements that are frequently-used (e.g., based upon access count) within the non-production data environment 102. In order to ensure the accuracy of the testing operations performed within the non-production data environment 102 that rely upon these frequently-used data elements (e.g., data elements of the first set), the transfer circuitry 212 may operate to frequently refresh or otherwise update these data elements. The first refresh rate may refer to the frequency at which the particular data element in the non-production data environment 102 is to be updated to account for any changes to the underlying user data element in the production data environment 101.

Thereafter, as shown in operation 515, the apparatus (e.g., frequency server 200) includes means, such as the processor 202, the access circuitry 210, transfer circuitry 212, or the like, for grouping a second data element into the first set of data elements based upon a data dependency between the first data element and the second data element. As described above, the example first data element (e.g., user mortgage data) may include an access count that is indicative of frequent access of the first data element such that the first data element is grouped in the first set. A second data element (e.g., user credit card data) may include an access count that is indicative of infrequent access of the second data element such that the second data element would otherwise be grouped in the second set. In the embodiment of FIG. 5, however, the access circuitry 210 may, due to the data dependency between the first data element and the second data element, group the second data element into the first set of data elements. In doing so, the access circuitry 210 may ensure that the integrity of the first data element in the non-production data environment 102 is maintained by refreshing data elements upon which the first data element depends.

As described above, various technical challenges are surmounted via technical solutions contemplated herein. For instance, example implementations of embodiments of the present disclosure perform access frequency determinations associated with data elements to ensure efficient data transfer between production and non-production environments. In operation, embodiments of the present disclosure may determine an access count from operations that occur in the production data environment (e.g., as part of an initial load or otherwise) or from operations in the non-production data environment (e.g., one or more prior iterations or operations in the non-production environment). Such an access count may be compared against various frequency thresholds in order to group data elements into sets with associated refresh rates. For data elements that are accessed more frequently, a first refresh protocol may be used with a first refresh rate. For data elements that are infrequently accessed, a second refreshed protocol may be used with a second refresh rate that is less than the first refresh rate. The use of these distinct refresh rates for data elements based upon access frequency therefore eliminates or otherwise reduces unnecessary data element transfer operations (e.g., masking, generation of synthetic data, or the like) resulting in more efficient data transfer between production and non-production environments. In this way, the inventors have identified that the advent of new test management systems have created a new opportunity for solutions for providing efficient data transfer which were historically unavailable. In doing so, such example implementations confront and solve at least two technical challenges: (1) they accurately identify complex data dependency relationships as related to access frequency determinations, and (2) they minimize storage and computational burdens associated with data analytic systems.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the frequency server 200 and executed by a processor 202 of the frequency server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for optimization of frequency based operations, the computer-implemented method comprising:
    generating a usage metric corresponding to usage of a plurality of data elements;
    determining, based on the usage metric, an access frequency associated with each data element of the plurality of data elements;
    grouping each data element of the plurality of data elements into a first set of data elements or a second set of data elements based upon the determined access frequency;
    refreshing the first set of data elements according to a first refresh protocol defining a first refresh rate;
    refreshing the second set of data elements according to a second refresh protocol, wherein the second refresh protocol defines a second refresh rate less than the first refresh rate; and
    outputting the plurality of refreshed data elements to a non-production data environment.

2. The computer-implemented method according to claim 1, wherein the non-production data environment is associated with a business domain from amongst a plurality of business domains.

3. The computer-implemented method according to claim 1, wherein determining the access frequency associated with each data element further comprises:
    determining an access count for each data element of the plurality of data elements;
    comparing the access count for each data element of the plurality of data elements with a frequency threshold;
    in an instance in which the access count satisfies the frequency threshold, grouping a data element of the plurality of data elements in the first set of data elements; and
    in an instance in which the access count fails to satisfy the frequency threshold, grouping a data element of the plurality of data elements in the second set of data elements.

4. The computer-implemented method according to claim 3, wherein the access count is determined based upon operations in a production data environment.

5. The computer-implemented method according to claim 3, wherein the access count is determined based upon operations in the non-production data environment.

6. The computer-implemented method according to claim 1, wherein grouping each data element further comprises:
    determining one or more data dependencies associated with a first data element;
    grouping the first data element into the first set of data elements based upon the determined access frequency; and
    grouping a second data element into the first set of data elements based upon a data dependency between the first data element and the second data element.

7. The computer-implemented method according to claim 1, wherein the first refresh protocol and the second refresh protocol employ one or more data masking or synthetic data generation operations associated with the first set of data elements and the second set of data elements, respectively.

8. The computer-implemented method according to claim 1, wherein the first refresh protocol employs static data masking operations and the second refresh protocol employs dynamic data masking operations.

9. An apparatus for optimization of frequency based operations, the apparatus comprising:

access circuitry configured to:
  generate a usage metric corresponding to usage of a plurality of data elements,
  determine, based on the usage metric, an access frequency associated with each data element of the plurality of data elements, and
  group each data element of the plurality of data elements into a first set of data elements or a second set of data elements based upon the determined access frequency;
transfer circuitry configured to:
  refresh the first set of data elements according to a first refresh protocol defining a first refresh rate, and
  refresh the second set of data elements according to a second refresh protocol, wherein the second refresh protocol defines a second refresh rate less than the first refresh rate; and
communications circuitry configured to output the plurality of refreshed data elements to a non-production data environment.

10. The apparatus according to claim 9, wherein the non-production data environment is associated with a business domain from amongst a plurality of business domains.

11. The apparatus according to claim 9, wherein the access circuitry is further configured to:
  determine an access count for each data element of the plurality of data elements;
  compare the access count for each data element of the plurality of data elements with a frequency threshold;
  in an instance in which the access count satisfies the frequency threshold, group a data element of the plurality of data elements in the first set of data elements; and
  in an instance in which the access count fails to satisfy the frequency threshold, group a data element of the plurality of data elements in the second set of data elements.

12. The apparatus according to claim 11, wherein the access count is determined based upon operations in a production data environment.

13. The apparatus according to claim 11, wherein the access count is determined based upon operations in the non-production data environment.

14. The apparatus according to claim 9, wherein the access circuitry is further configured to:
  determine one or more data dependencies associated with a first data element;
  group the first data element into the first set of data elements based upon the determined access frequency; and
  group a second data element into the first set of data elements based upon a data dependency between the first data element and the second data element.

15. The apparatus according to claim 9, wherein the transfer circuitry is further configured to employ one or more data masking or synthetic data generation operations associated with the first set of data elements and the second set of data elements as defined by the first refresh protocol and the second refresh protocol, respectively.

16. The apparatus according to claim 9, wherein the transfer circuitry is further configured to employ static data masking operations as defined by the first refresh protocol and employ dynamic data masking operations as defined by the second refresh protocol.

17. A non-transitory computer-readable storage medium for optimization of frequency based operations, the non-transitory computer-readable storage medium storing instructions that, when executed, cause an apparatus to:
  generate a usage metric corresponding to usage of a plurality of data elements;
  determine, based on the usage metric, an access frequency associated with each data element of the plurality of data elements;
  group each data element of the plurality of data elements into a first set of data elements or a second set of data elements based upon the determined access frequency;
  refresh the first set of data elements according to a first refresh protocol defining a first refresh rate;
  refresh the second set of data elements according to a second refresh protocol, wherein the second refresh protocol defines a second refresh rate less than the first refresh rate; and
  output the plurality of refreshed data elements to a non-production data environment.

18. The non-transitory computer-readable storage medium according to claim 17 storing instruction that, when executed, cause the apparatus to:
  determine an access count for each data element of the plurality of data elements;
  compare the access count for each data element of the plurality of data elements with a frequency threshold;
  in an instance in which the access count satisfies the frequency threshold, group a data element of the plurality of data elements in the first set of data elements; and
  in an instance in which the access count fails to satisfy the frequency threshold, group a data element of the plurality of data elements in the second set of data elements.

19. The non-transitory computer-readable storage medium according to claim 17 storing instruction that, when executed, cause the apparatus to:
  determine one or more data dependencies associated with a first data element;
  group the first data element into the first set of data elements based upon the determined access frequency; and
  group a second data element into the first set of data elements based upon a data dependency between the first data element and the second data element.

20. The non-transitory computer-readable storage medium according to claim 17 storing instruction that, when executed, cause the apparatus to:
  employ static data masking operations in performing the first refresh protocol; and
  employ dynamic data masking operations in performing the second refresh protocol.

* * * * *